May 4, 1926.
J. A. GRIFFIN
BACK REST FOR VEHICLE SEATS
Filed Jan. 22, 1925
1,583,455
2 Sheets-Sheet 1
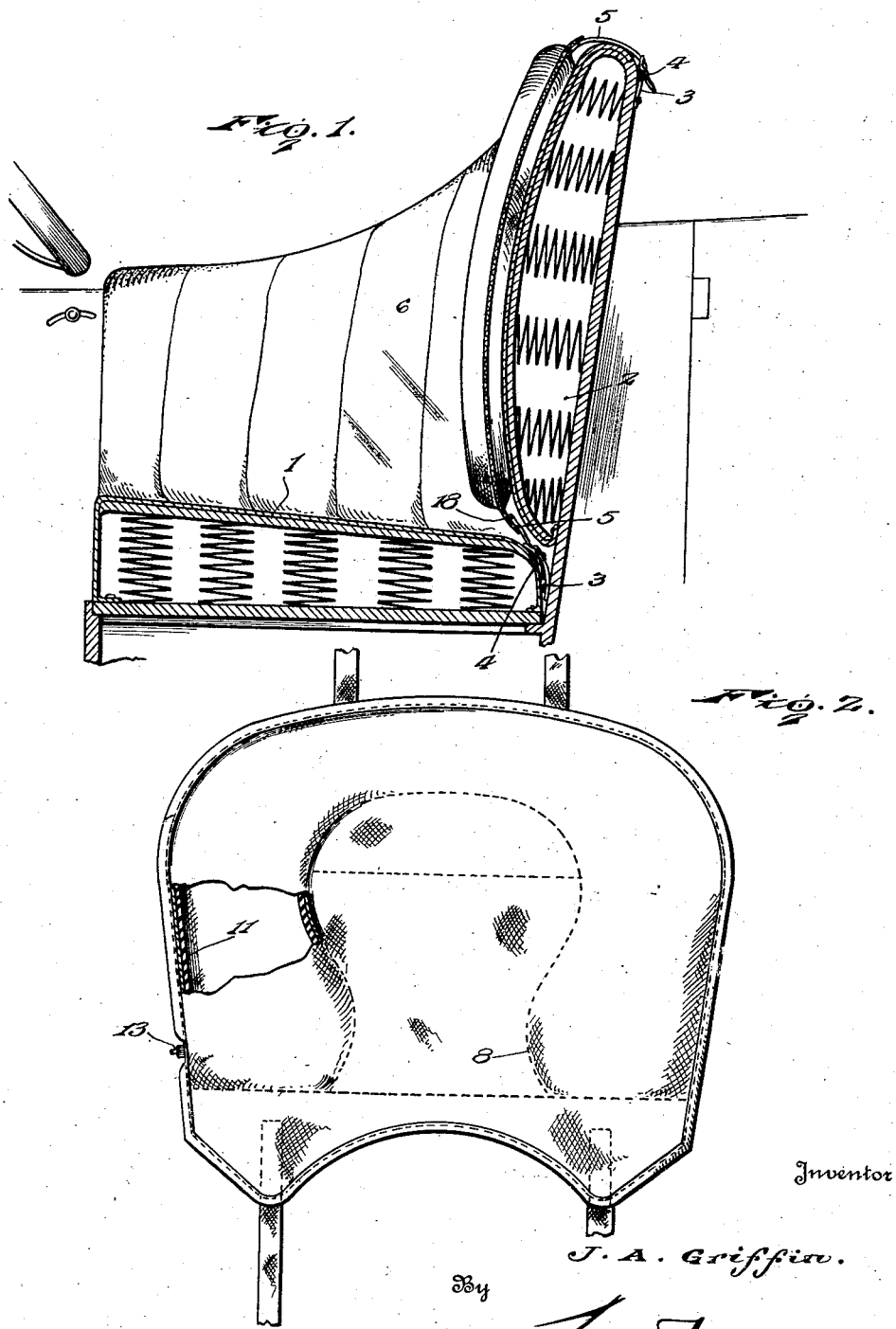

May 4, 1926.
J. A. GRIFFIN
BACK REST FOR VEHICLE SEATS
Filed Jan. 22, 1925
1,583,455
2 Sheets-Sheet 2
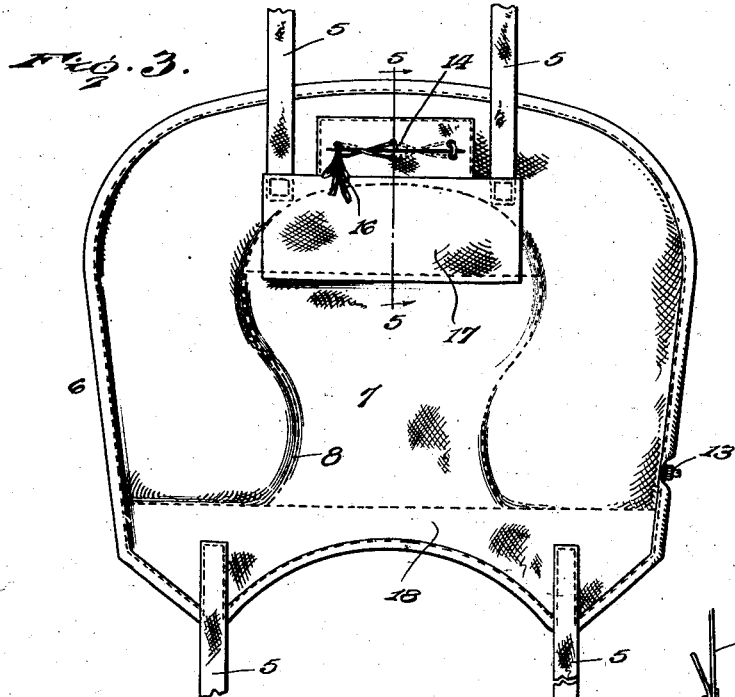
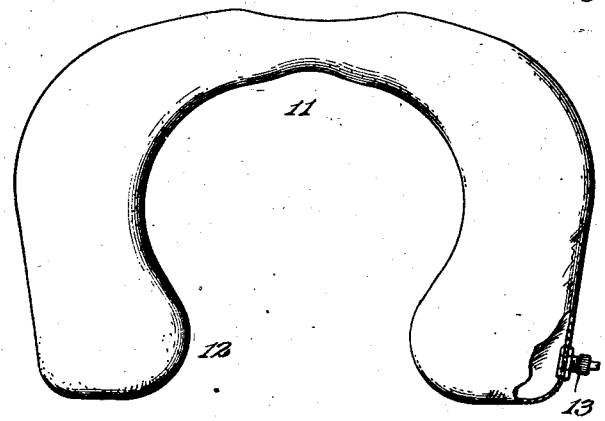
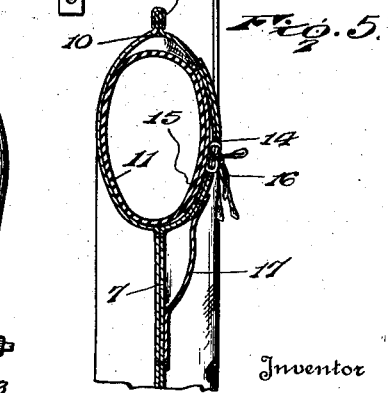
Inventor
J. A. Griffin.
By Lacey & Lacey, Attorneys Patented May 4, 1926.

1,583,455

UNITED STATES PATENT OFFICE.

JAMES ALEXANDER GRIFFIN, OF MEMPHIS, TENNESSEE.

BACK REST FOR VEHICLE SEATS.

Application filed January 22, 1925. Serial No. 4,120.

*To all whom it may concern:*

Be it known that I, JAMES A. GRIFFIN, a citizen of the United States, residing at Memphis, in the county of Shelby and State of Tennessee, have invented certain new and useful Improvements in Back Rests for Vehicle Seats, of which the following is a specification.

This invention is a back rest for vehicle seats and its primary object is to provide a light simple device which may be placed upon the back of the driver's seat in an automobile so as to permit him to sit well forward in the seat and at the same time have a comfortable support for his back. A further object of the invention is to provide an inflatable back rest of such form that it will fit the shape of the body and will be so connected with the back of the seat that it may be easily adjusted to support the driver's back at the proper points. The invention also seeks to improve generally the construction of a back rest for vehicle seats to the end that the comfort of the user will be enhanced and the cost of production and maintenance minimized.

In the accompanying drawings:

Figure 1 is a sectional elevation of a vehicle seat having my improved back rest applied thereto;

Fig. 2 is an elevation, partly broken away, of the back rest;

Fig. 3 is a rear elevation of the back rest;

Fig. 4 is a detail elevation of the inflatable tube, and

Fig. 5 is a detail section on the line 5—5 of Fig. 3.

The vehicle seat 1 with its back 2 may be of any known or approved construction. In carrying out my present invention, I secure to the seat frame at the top of the back and in rear of the seat cushion short straps 3 which may be of any suitable material and are preferably of textile fabric so that they will be light and will not detract from the sightliness of the seat to which they are applied. These straps are equipped with any preferred form of fastening devices, such as buckles 4, whereby they may be connected with straps 5 secured to the upper and lower portions of the back rest which is indicated as an entirety by the reference numeral 6. The back rest comprises a base member 7 which is preferably two plies of textile fabric stitched together along lines indicated at 8 and also connected at their margins by a hem or binder 9, the portion of the base member between the stitching 8 and the margin defining a pocket, indicated at 10 in Fig. 5, to receive an inflatable tube 11. As shown most clearly in Fig. 4, this tube is reduced in its cross sectional extent midway between its ends and is enlarged at its ends, as indicated at 12, the tube being also so formed as to present, when inflated, an inverted U-shaped figure. An inflation valve 13 of any approved type is fitted in the tube at one outer corner thereof, and this valve may be easily fitted through an opening provided therefor in the base member which constitutes an outer covering for the tube when the parts are assembled. The stitching 8 follows the inner outline of the tube 11 when the parts are assembled and the tube inflated. It will be readily noted that there is a narrow portion at the top of the rest which is adapted to extend across the shoulders of the driver while the side portions will be larger and, as a result of this peculiar formation of the tube, the rest will conform to the outline of the human body so that the driver or other occupant of the seat will be comfortably supported while sitting well forward upon the seat. An opening, indicated at 14, is provided in the rear ply of the base or cover member 7 and within the pocket which receives the inflatable tube a flap 15 is secured to extend across this opening between the cover and the tube so that the tube will be thoroughly protected when it is in the pocket. The opening 14 provides ready means for inserting the tube in the pocket and also facilitates the removal of a damaged tube and the substitution of a repaired or new tube therefor. When the tube is in place, the opening 14 is closed by having its edges drawn together through the medium of lacing, indicated at 16. To reinforce the back of the rest at the upper portion thereof, I secure a fabric strip 17 which has its upper edge secured to the fabric cover immediately below the opening 14 and its lower edge secured to the cover or base member below the top portion of the tube-receiving pocket and between the side portions of the same, as shown clearly in Fig. 3. The possible wear of the cover below the top portion of the tube is thus overcome and excessive stretching of the fabric at the point where the greatest stress is imposed upon the tube is prevented.

The upper straps 5 are secured to the base or cover member of the back rest at the sides of the opening 14 and have their ends secured under the corner portions of the reinforcing member 17. These straps are adapted to extend backwardly from the back rest over the top of the seat back to be adjustably engaged with the buckles or other fasteners on the fixed straps 3. The lower straps 5 are secured to an apron or extension 18 formed by the lower portion of the base member 7 below the tube-receiving pocket, and this apron or extension is adapted to fit within the angle defined by the seat back 2 and the seat cushion 1 so that the lower portion of the back rest will be held close to the seat back and the seat back will be protected from an undue accumulation of dust or other matter. The provision of the connecting straps permits the back rest to be adjusted vertically relative to the seat back so that it may be placed at such a point of the seat back as is most comfortable to the user. The device is exceedingly simple and may be produced at a low cost and readily applied to any vehicle seat. If desired, a seat-protecting member may be attached to the extension or apron 18 to extend over the seat cushion 1.

Having thus described the invention, I claim:

A back rest for vehicle seats comprising a base member consisting of two plies of fabric secured together along their edges and stitched together near their top and side edges whereby to form a marginal pocket, an inflatable tube fitted in and filling said pocket, an opening being provided in the back of the pocket at the top thereof to facilitate the insertion of the tube, a flap secured in the pocket and adapted to extend over said opening, means for closing the opening, a reinforcing member secured to the back of the base member below the top portion of the pocket and overlying the adjacent portion of the pocket, the lower end of the base member extending beyond the ends of the pocket, fastening straps secured to the extended lower end of the base member, and other fastening straps secured to the base member at the upper corners of the reinforcing member.

In testimony whereof I affix my signature.

JAMES ALEXANDER GRIFFIN. [L. S.]